Aug. 7, 1956     F. VALDES     2,757,695
NUT SHELLING MACHINES
Filed Feb. 2, 1953     4 Sheets-Sheet 1
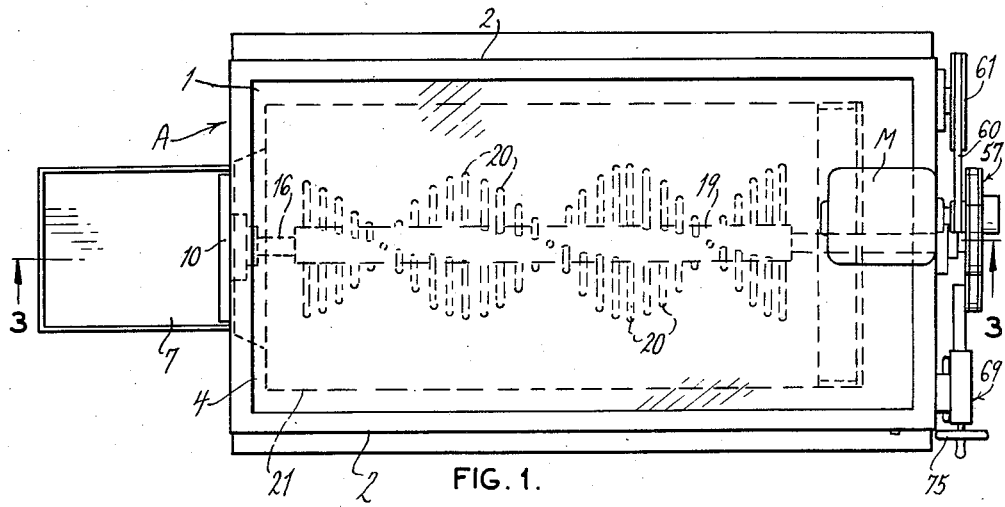
FIG. 1.
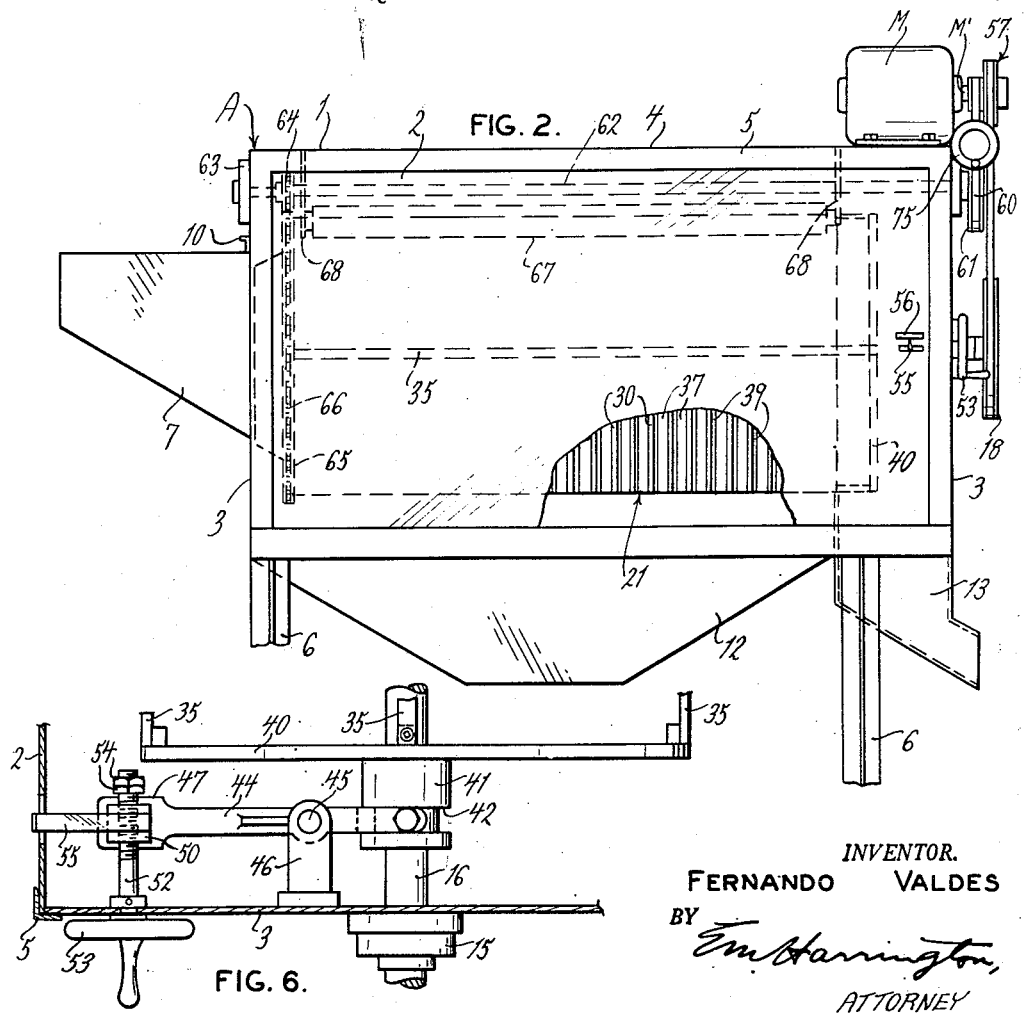
FIG. 2.
FIG. 6.
INVENTOR.
FERNANDO VALDES
BY
*Em Harrington,*
ATTORNEY

INVENTOR.
FERNANDO VALDES

Aug. 7, 1956   F. VALDES   2,757,695
NUT SHELLING MACHINES
Filed Feb. 2, 1953   4 Sheets-Sheet 3

INVENTOR.
FERNANDO VALDES
BY
*E. M. Harrington*
ATTORNEY

Aug. 7, 1956 F. VALDES 2,757,695
NUT SHELLING MACHINES
Filed Feb. 2, 1953 4 Sheets-Sheet 4

INVENTOR.
FERNANDO VALDES
BY
ATTORNEY

United States Patent Office 2,757,695
Patented Aug. 7, 1956

2,757,695

NUT SHELLING MACHINES

Fernando Valdes, San Antonio, Tex., assignor to Champion Machine Company, Inc., San Antonio, Tex., a corporation of Texas Application February 2, 1953, Serial No. 334,411

7 Claims. (Cl. 146—8)

This invention relates generally to machines for shelling edible nuts and more specifically to such a machine which includes a cylinder adapted for rotation with a body of cracked nuts tumbled about therein and which is provided with a multiplicity of annular members, which are spaced apart to provide spaces therebetween through which nut meats and shell fragments pass, the predominant objects of the invention being to provide such a machine which includes means whereby the widths of the spaces between said adjacent pairs of said annular members may be regulated from the exterior of the machine when the machine is at rest or is in operation.

Fig. 1 is a top, plan view of the improved nut shelling machine of this invention.

Fig. 2 is a side elevation of the machine illustrated by Fig. 1, with a leg thereof broken away.

Fig. 6 is a fragmentary, horizontal section taken on line 6—6 of Fig. 4.

Figure 3:
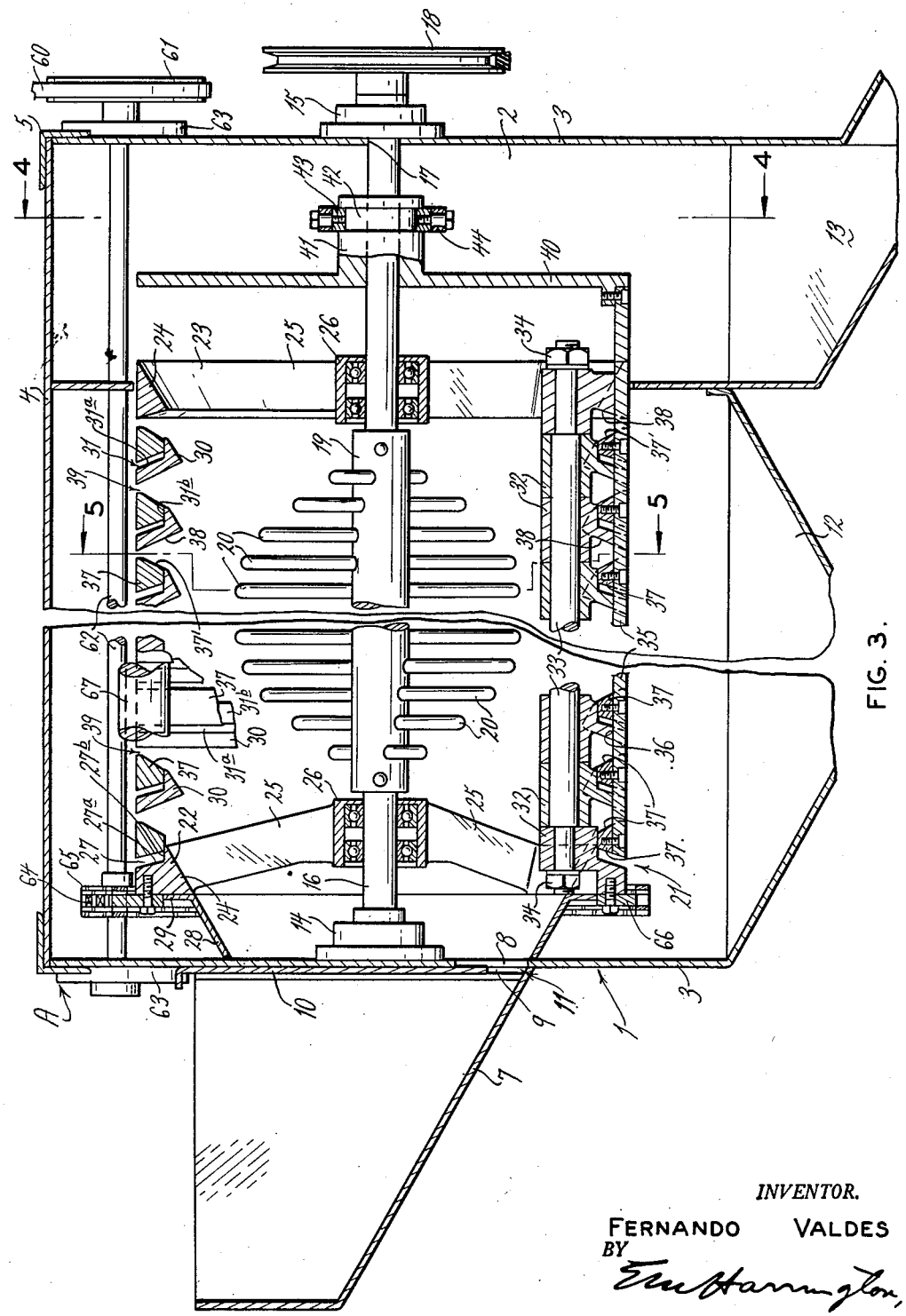
Fig. 3 is an enlarged fragmentary, vertical section taken on line 3—3 of Fig. 1.

In the drawings, wherein is shown for purposes of illustration, merely, one embodiment of the invention, A designates the improved shelling machine of this invention generally. The shelling machine A comprises a housing 1 which is generally of rectangular shape, said housing having opposed side walls 2, opposed end walls 3, and a top wall 4, these walls being supported by a frame structure 5 which includes angle members at the corners of the housing and depending supporting legs 6. At one end of the housing 1 a hopper 7 is provided, said hopper being fixed to the end wall of the housing at that end thereof, and an opening 8 (Fig. 3) being formed in said end wall of the housing. At the inner end of the hopper 7 a guideway 9 is formed at opposite sides of the hopper and these guideways receive marginal portions at opposite sides of a gate 10 which permits of the gate being raised and lowered to provide an inlet passageway 11 of the desired height for edible nuts moving between the hopper and the interior of the housing. At the bottom of the housing 1 a chute 12 is provided through which is discharged nut meats and parts thereof and shell fragments, suitable receptacles being disposed beneath the chute 12 to receive said nut meats and shell fragments. Also, adjacent to the end of the housing 1 opposite to the end thereof at which the hopper 7 is located, a second chute 13 is provided through which rejects pass from the machine to a receptacle provided for the reception of said rejects beneath said chute 13.

Figure 5:
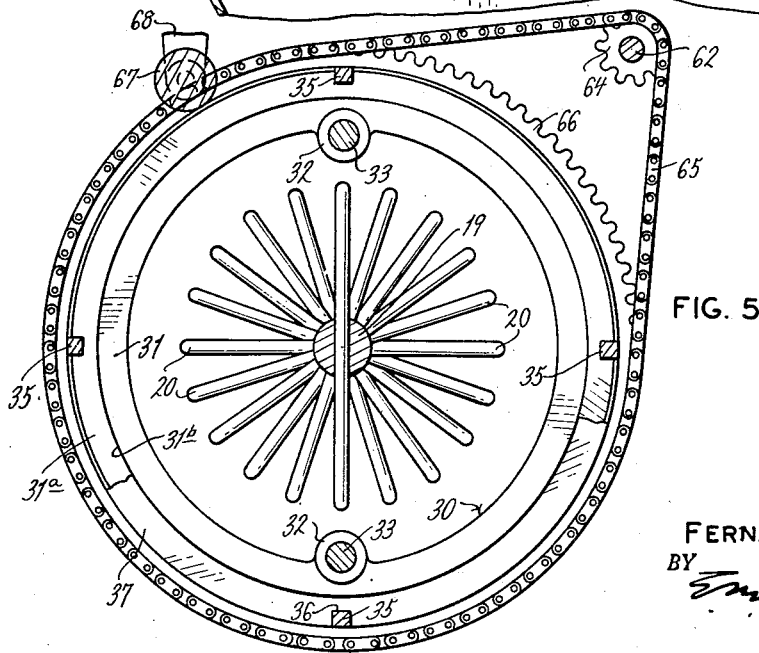
Fig. 5 is a fragmentary, cross-section taken on line 5—5 of Fig. 3.

Suitably secured to the opposed end walls of the housing 1 is a pair of bearing structures 14 and 15, the bearing structure 14 being located within the housing, while the bearing structure 15 is located exteriorly of said housing. The bearings 14 and 15 support for rotation a shaft 16 which projects through an opening 17 formed through the end wall 3 of the shelling machine at the right end thereof, as said machine is viewed in Fig. 3, said projected shaft portion having a pulley 18 fixedly mounted thereon at its outer end portion. The shaft 16 is provided with a portion 19 of increased diameter from which a multiplicity of pins 20 extend, said pins being so arranged that they provide a spiral conveyer which extends longitudinally of the enlarged portion of the shaft 16, as is shown to good advantage in Fig. 1. Thus, the pins 20 serve to convey the nuts being shelled by the machine longitudinally of the housing 1 and at the same time said pins act as beaters which strike the nuts being shelled so as to disengage shell fragments from the meats of said nuts. The pins 20 may be secured to the shaft portion 19 in any suitable manner, for instance, said pins may be extended in a drive-fit manner through openings formed through said shaft portion 19, as is suggested by Fig. 5.

The shelling machine A includes a cylinder 21 which is comprised of a pair of opposed end members 22 and 23, said end members each having an annular outer rim portion 24 from which are extended inwardly a plurality of radial spokes 25, there being a ball-bearing structure 26 at the inner ends of the spokes of each end member which embraces portions of the shaft 16 for rotation thereabout. The annular outer rim portion of the end member 22 is shaped as is shown in Fig. 3; that is to say said rim portion is provided with a recess 27 having an inclined wall 27a and a wall 27b which is extended from said inclined wall 27a in substantial parallelism with respect to the axis of the shaft 16. Also, the end member 22 has associated therewith a tapered, tubular member 28 which is provided at one end with an annular flange 29 that is fixed to said end member 22, and the opposite end of said tubular member terminates in close proximity to the inner face of the adjacent end wall 3 of the housing 1, the purpose of the tapered tubular member 28 being to guide nuts passing from the hopper 7 through the opening 8, into the interior of the cylinder 21. The annular, outer rim portion of end member 23 is generally wedge-shaped in cross-section, as is shown to good advantage in Fig. 3, and interposed between the end members 22 and 23 is a plurality of annular members 30 each of which is provided with a recess 31 having an inclined wall 31a and a wall 31b which is arranged in substantial parallelism with respect to the axis of the shaft 16.

The end members 22 and 23 with the annular members 30 interposed therebetween are secured together to provide a cylinder unit, each end member and each member 30 interposed therebetween being provided with a pair of diametrically opposed ears 32, extended inwardly from the rim portions of said members and said end members, the ears of said end members 22 and 23 and the ears of the members 30 interposed therebetween being alined with each other with tie rods 33 extended through openings formed through said ears and having nuts 34 at opposite ends of said tie rods. By referring to Fig. 3 it will be noted that the ears 32 formed on the end members 22 and 23 and on the members 30 interposed therebetween are elongated in the direction of the length of the cylinder 21, and that adjacent ears contact with each other to serve as spacers for the end members 22 and 23 and the members 30 interposed therebetween, this arrangement maintaining said members in their proper spaced relationship.

Figure 4:
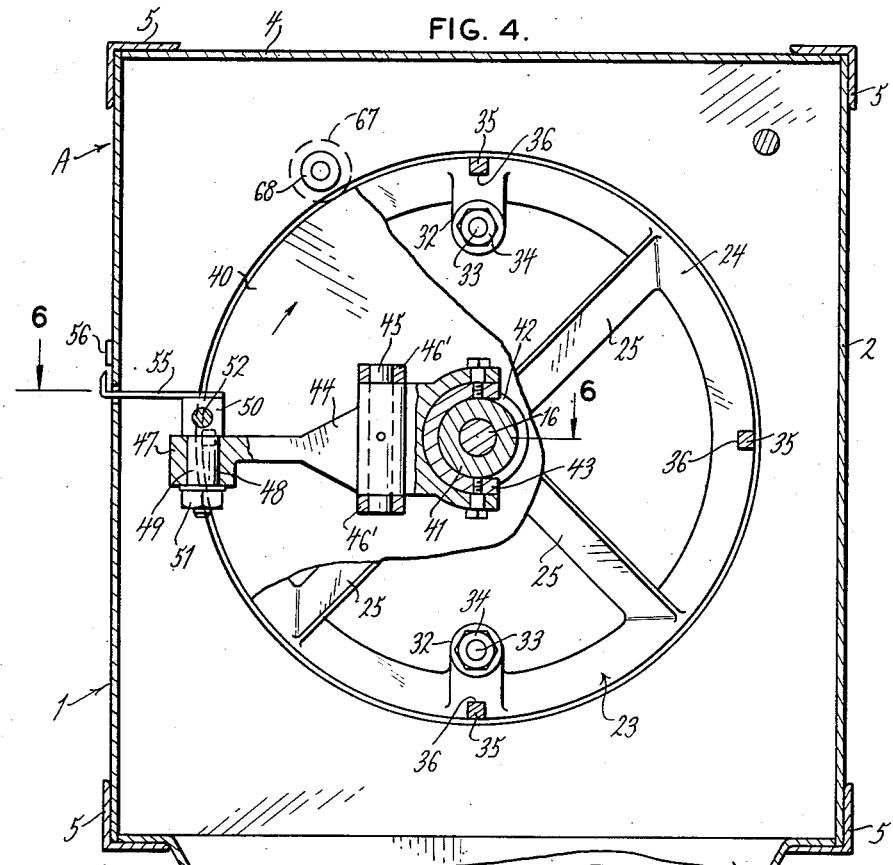
Fig. 4 is a fragmentary, cross-section taken on line 4—4 of Fig. 3.

The structure of the cylinder 21 includes a plurality of bars 35 which are mounted for sliding movement in recesses 36 formed in the rim portions of the annular members 30 and the end member 23, and these bars have fixed thereto a plurality of rings 37. The rings 37 are of tapered shape and are disposed in the recesses 27 formed in the outer rim portions of the end member 22 and the recesses 31 of the members 30, so that the inner faces of the rings 37 contact with the face 27b of the recess of the end member 22 and with the faces 31b of the recesses of the annular members 30. The inclined faces 37' of the rings 37 cooperate with inclined faces 38 of the members 30 and the end member 23 to provide the cylinder wall with annular slots 39 which may be adjusted to provide slots of different widths, this being accomplished by a circular plate 40 to which is secured the plurality of bars 36 and which is supported by the shaft 16 for sliding movement. The circular plate 40 is provided with a hub portion 41 which has an annular groove 42 formed therein, said groove receiving a curved shoe 43 (Fig. 4) that is mounted within the bifurcated end portion of an arm 44. The arm 44 is pivoted by a pivot element 45 between the spaced legs 46' of a bracket 46 which is suitably secured to the inner face of an end wall of the housing 1 (Fig. 6). The outer end of the arm 44 has a boss 47 formed thereon through which an opening 48 is formed, and extended through said opening is a spindle 49, said spindle having an enlarged upper portion 50 which rests on the top face of said arm 44, and at its lower end said spindle has a nut 51 mounted thereon. The enlarged, upper end portion 50 of the spindle 49 has a screwthreaded opening formed therethrough through which a screwthreaded rod 52 is screwthreadedly extended, said screwthreaded rod being supported for rotation by an end wall 3 of the housing 1, through which it passes, and having a hand wheel 53 fixedly mounted on the outer end portion thereof exteriorly of the housing 1. Also, nuts 54 are mounted on the screwthreaded, outer, portion of said screwthreaded rod 52. The upper, enlarged portion 50 of the spindle 49 has an indicator arm 55 secured thereto and projected through a slot in a side wall of the housing 1, said indicator arm being provided with an upwardly turned portion at its outer end which moves with respect to a scale plate 56 fixed to a side wall of the housing 1.

Fixedly mounted on the top wall of the housing 1 is a motor M which has mounted on its motor shaft a variable speed pulley structure 57 over which operates a transmission belt 58, said belt 58 operating, also, over the pulley 18 which is previously described herein as being fixedly mounted on the shaft 16 exteriorly of the housing 1. The motor shaft has mounted on it, also, a pulley 59 over which operates a transmission belt 60 which operates, also, over a pulley 61 which is mounted exteriorly of the housing 1 on an end portion of a shaft 62 that extends through the housing 1 and is supported for rotation by bearings 63 supported by the opposed end walls of said housing. The shaft 62 has fixedly mounted thereon for rotation therewith a sprocket wheel 64 over which operates a sprocket chain 65, said sprocket chain operating, also, over a sprocket wheel 66 which is secured to the end member 22 of the cylinder 21. In order to dislodge shell fragments and pieces of nut meat which may become lodged in the annular slots 39 between the rings 37 and the members 30, and between an end ring 30 and the end member 23, an elongated roller 67 is provided. This elongated roller extends the full length of the cylinder 21 in rolling contact with the circumferential face of said cylinder, and said roller is supported for rotation by a pair of brackets 68 which project downwardly from the upper portion of the housing 1.

Figure 7:
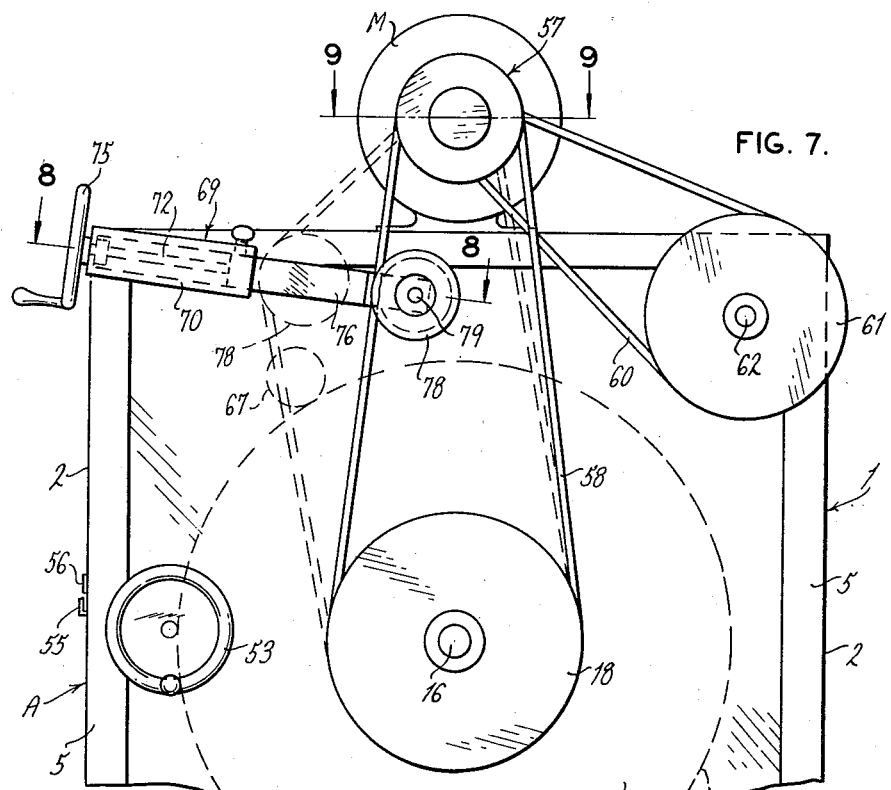
Fig. 7 is an enlarged fragmentary end elevation of the machine of this invention.
Figure 8:
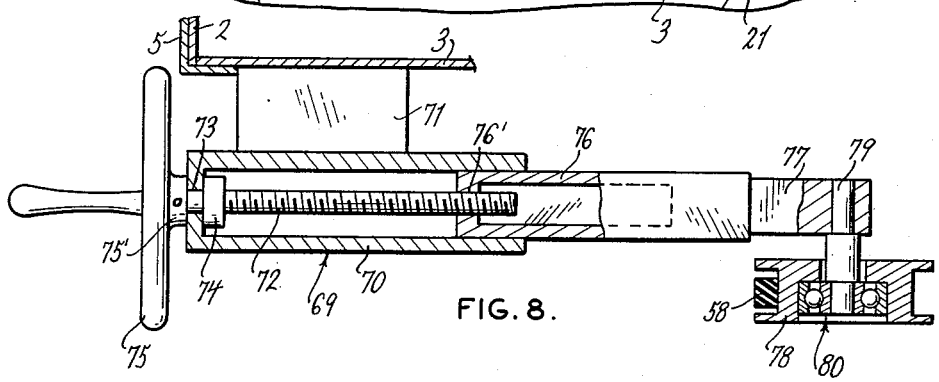
Fig. 8 is an enlarged, fragmentary, section taken on line 8—8 of Fig. 7.
Figure 9:
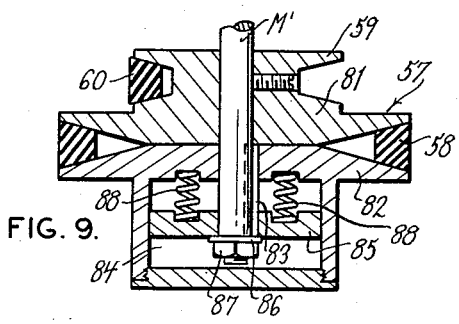
Fig. 9 is an enlarged, section taken on line 9—9 of Fig. 7.

In order to provide for rotating the shaft 16 at different speeds a structure 69 for drawing a portion of the belt 58 outwardly is employed. This structure 69 comprises a barrel 70 which is supported by a bracket 71 which extends outwardly from an end wall of the housing 1. Disposed within the barrel 70 is a rod 72 which is supported for rotation in an opening 73 formed in the end wall of the barrel, there being a collar 74 mounted on said rod 72 and contacting with the inner face of said end wall of the barrel, and a hand wheel 75 that is mounted on the outer end portion of said rod is provided with a hub portion 75' which contacts with the outer face of said end wall of the barrel 70 (Fig. 8). The rod 72 is screwthreaded throughout the shank portion thereof which projects beyond the collar 74, and this screwthreaded portion extends in a screwthreaded manner through a screwthreaded opening 76' formed through the end wall of a member 76 which is arranged in telescopic relation with respect to the barrel 70. At its outer end the member 76 is provided with an extension 77 which supports a pulley 78, there being a spindle 79 supported by said extension 77 which supports said pulley with the aid of a ball-bearing structure 80. By referring to Fig. 9 it will be noted that the variable speed pulley structure 57 comprises a pair of pulley members 81 and 82, the pulley member 81 being fixed to the motor shaft M' of the motor M while the pulley member 82 is keyed to said motor shaft by means of a key 83. Arranged in a cavity 84 of the pulley portion 82 is a plate 85 which contacts with a washer 86 which in turn contacts with a nut 87 mounted on a screwthreaded end portion of the motor shaft M', there being a plurality of coil springs 88 interposed between said plate 85 and a portion of the pulley portion 82. The pulley 78 engages a portion of the belt 58, as is shown in Fig. 7 and by rotating the hand wheel 75 in the appropriate direction the belt 58 may be caused to be drawn deeper in the crotch between the pulley members 81 and 82 to vary the speed of operation of the belt, the coil springs 88 serving, when the hand wheel is rotated in the opposite direction, to move said pulley portions toward each other so as to move the belt 58 toward the periphery of the pulley and thus change the speed of operation of the belt as desired.

In the operation of the improved shelling machine of this invention the nuts to be shelled are fed from the hopper 7 through the opening beneath the gate 10, into the interior of the cylinder 21. The cylinder 21 is rotated slowly by the sprocket chain 65 with respect to the shaft 16, and said shaft 16 is rotated by the transmission belt 58 at a much higher rate of speed. The pins 20 serve the dual purpose of acting as a spiral conveyor which moves the nuts longitudinally of the machine and functioning as beaters which strike the nuts so as to dislodge shell fragments therefrom. The nut meats and parts thereof and the shell fragments drop into the bottom of the cylinder 21 and pass through the circumferential spaces 39 thereof into the chute 12 for deposit in a receptacle located beneath said chute, with the exception of those nuts which are too large to pass through the circumferential spaces 39 of the cylinder 21. These nuts continue their passage through the machine to a point beyond the end member 23 of the cylinder where they drop into the chute 13 for deposit as rejects in a receptacle located beneath said chute. It frequently happens that it is desired to alter the width of the circumferential spaces 39 of the cylinder of the machine 1 and in the operation of the machine of this invention this may be accomplished either when the machine is at rest or is in operation by merely rotating the hand wheel 53 in the appropriate direction to make the circumferential spaces wider or narrower as desired. Such rotation of the hand wheel 53, through the cooperation of the arm 44 (Fig. 6), will move the circular plate 40 and the bars 35 secured thereto in the appropriate direction to move the rings 37, which are secured to said bars, toward or from the inclined circumferential faces 38 of the cylinder 21 to vary the widths of the circumferential cylinder spaces as desired.

I claim:

1. In a machine of the character described wherein a rotary screening drum has a series of annular slots of predetermined width for screening the discharge; the improvement comprising said drum being constituted by a series of alternating rings and annular members, said annular members being supported upon a first axially-extending support, said rings being supported upon a second axially-extending support, said supports being mounted for axial movement relative to one another and being otherwise supported for rotary movement, and adjustable means coupled to one of said supports for moving it axially relative to said other support, thereby to vary the width of the discharge slots.

2. A machine of the character set forth in claim 1, wherein said drum is mounted within a housing, there being an exterior adjustable element and interior means coupling said exterior adjustable element to the axially-movable support.

3. A machine of the character set forth in claim 1, wherein each annular member is in axial overlapping relationship with respect to an adjacent ring to form an annular unit, the rings being axially movable with respect to the annular members while preserving said overlapping relationship, thereby to vary the width of the slots defined between said units.

4. A machine of the character set forth in claim 3, wherein the units constituted by a ring and annular member are of outwardly flaring cross-sectional shape so as to define outwardly converging annular slots.

5. In a nut shelling machine of the type having a generally-horizontal agitator shaft and a surrounding drum mounted for rotation about said shaft, said drum having annular slots of predetermined width for screening the discharge; the improvement comprising said drum being constituted by a series of annular units disposed in axially-spaced relationship from one another, each unit being constituted by an annular member and a ring disposed in axially-overlapping relationship to one another, the several annular members being mounted upon a set of rods extending axially, the several rings being supported upon a set of axially-extending bars, end members defining the ends of said drum, said rods being fixed to said end members and said bars being slidably carried by said end members.

6. A nut shelling machine as set forth in claim 5 further including a third end member mounted for rotation about and axial movement on the agitator shaft, said bars being connected to said third end member, and a shift member having a rotary coupling with said third end member, and adjustable means connected to said shift member, thereby to displace the rings and vary the width of the discharge slots defined between the annular units of the drum.

7. A nut shelling machine of the character set forth in claim 5, wherein the annular members project inwardly over the associated rings, the outer sides of said annular members and rings diverging in the outward direction to define outwardly converging annular slots, the outer peripheries of the annular members and rings being on the same radii to provide a relatively smooth outer surface for the drum.

References Cited in the file of this patent

UNITED STATES PATENTS

| | | |
|---|---|---|
| 1,585,771 | Crabb | May 25, 1926 |
| 1,762,684 | Frazier | June 10, 1930 |
| 1,772,971 | Vaudreuil | Aug. 12, 1930 |
| 2,164,372 | Anderson | July 4, 1939 |
| 2,298,497 | Meyer | Oct. 13, 1942 |
| 2,523,055 | Pizzo | Sept. 19, 1950 |
| 2,543,537 | Smith | Feb. 27, 1951 |
| 2,559,299 | Helling | July 3, 1951 |
| 2,568,134 | Tharpe | Sept. 18, 1951 |
| 2,669,268 | Meyer | Feb. 16, 1954 |
| 2,687,212 | Kerr et al. | Aug. 24, 1954 |